United States Patent
Zeevi et al.

(10) Patent No.: US 7,320,109 B1
(45) Date of Patent: Jan. 15, 2008

(54) DYNAMIC USER INTERFACE

(75) Inventors: Dani Zeevi, Yehuda (IL); Naomi Levavi, Herzliya (IL)

(73) Assignee: YCD Ltd., Herzlia (IL)

( * ) Notice: Subject to any disclaimer, the term of this patent is extended or adjusted under 35 U.S.C. 154(b) by 1006 days.

(21) Appl. No.: 09/720,075

(22) PCT Filed: Nov. 13, 2000

(86) PCT No.: PCT/IL00/00744

§ 371 (c)(1),
(2), (4) Date: Mar. 22, 2002

(87) PCT Pub. No.: WO01/37071

PCT Pub. Date: May 25, 2001

(30) Foreign Application Priority Data

Nov. 14, 1999  (IL) .................................... 132929

(51) Int. Cl.
*G06F 3/048* (2006.01)
(52) U.S. Cl. ..................... 715/763; 715/762; 715/811; 715/764; 715/765; 715/810
(58) Field of Classification Search ................ 345/762; 715/760, 761, 762–763, 765–769, 809–816
See application file for complete search history.

(56) References Cited

U.S. PATENT DOCUMENTS 4,721,951 A * 1/1988 Holler ........................ 345/603
5,491,782 A * 2/1996 King et al. .................. 345/833
5,684,969 A * 11/1997 Ishida ......................... 345/800
5,850,531 A    12/1998 Cox et al.
5,874,966 A    2/1999 Polimeni et al.
6,002,401 A * 12/1999 Baker ......................... 345/839
6,118,427 A * 9/2000 Buxton et al. .............. 345/629
6,262,724 B1 * 7/2001 Crow et al. ................. 345/723
6,300,947 B1 * 10/2001 Kanevsky .................... 715/866
6,314,415 B1 * 11/2001 Mukherjee ................... 706/47
6,392,671 B1 * 5/2002 Glaser ......................... 715/765
6,707,476 B1 * 3/2004 Hochstedler ................. 715/789
6,731,310 B2 * 5/2004 Craycroft et al. ........... 715/765
6,791,581 B2 * 9/2004 Novak et al. ............... 715/745

OTHER PUBLICATIONS

Http://web.archive.org/web/19990428181707/winamp.com/winamp/overview.html.*
"Window Blinds" Skin Utility, STARDOCK, published on or before Jan. 13, 2000, one page. (Internet address: www.stardock.com).

(Continued)

*Primary Examiner*—John Cabeca
*Assistant Examiner*—Peng Ke
(74) *Attorney, Agent, or Firm*—Welsh & Katz, Ltd.

(57) ABSTRACT

A method for creating a graphic user interface (GUI) for a computer application includes defining a relation that associates certain graphic elements (84, 86, 88, 90, 92) with corresponding user interface elements (64, 66, 68, 70, 72) that are linked to functions of the application. An image (80) is provided that includes one or more of the graphic elements at respective locations in the image. A user interface screen (140) is generated responsive to the image, such that the user interface elements are mapped to positions on the screen determined by the respective locations of the corresponding graphic elements in the image.

39 Claims, 6 Drawing Sheets

OTHER PUBLICATIONS

"Winamp" Skin Utility, NULLSOFT Inc., published on or before Jan. 13, 2000, 4 pages. (Internet address.: www.winamp.com).

"ActiveSkin" Skin Utility, SOFTSHAPE, published on or before Jan. 13, 2000, 7 pages. (Internet address: www.softshape.com/activeskin).

Internet address: http://www.whatis.com/skin.htm, one page (last updated Sep. 20, 1999).

"The Quintessential CD "QCD 2.0 Player"", described in "Designing User Interfaces ('Skins') for the QCD 2.0 Player", (Internet Address: www.quinnware.com), (published after the Priority Date of the present invention), 17 pages.

"Window Blinds" Skin Utility, STARDOCK, published on or before Jan. 13, 2000, one page. (Internet address: www.stardock.com).

"Winamp" Skin Utility, Nullsoft Inc., published on or before Jan. 13, 2000, 4 pages. (Internet address.: www.winamp.com).

"ActiveSkin" Skin Utility, SOFTSHAPE, published on or before Jan. 13, 2000, 7 pages. (Internet address: www.softshape.com/activeskin).

Internet address: http://www.whatis.com/skin.htm, one page (last updated Sep. 20, 1999).

"The Quintessential CD QCD 2.0 Player", described in "Designing User Interfaces ([Skins]) for the QCD 2.0 Player", (Internet Address: www.quinnware.com), (published *after* the Priority Date of the present invention), 17 pages.

Internet Screen Shots from www.32bit.com ("Active Skin", pp. 1-2, Apr. 1999).

* cited by examiner

DYNAMIC USER INTERFACE

FIELD OF THE INVENTION

The present invention relates generally to computer software, and specifically to tools for generating graphic user interfaces.

BACKGROUND OF THE INVENTION

Graphic user interfaces (GUIs) have become the accepted means for interaction between computer programs and their users. A variety of tools are known in the art, such as Visual Basic and Visual C++, for use by computer application developers in designing a GUI. These tools provide standard building blocks, including controls, such as menu bars, push buttons, sliders, check boxes and knobs, as well as areas for text input. To create a GUI, the application developer selects the appropriate building blocks and arranges them on the screen. Each of the building blocks is used to invoke an appropriate function in the application program.

A "skin" can be used to change the visual appearance of the GUI, without changing the underlying functionality. The skin is a graphic file that provides a visual cover for the elements of the GUI. For example, Stardock (www.stardock.com) offers a skin utility known as "WindowBlinds," which allows the user to change the style of title bars, buttons, toolbars and other elements of the Microsoft Windows GUI. Winamp (www.winamp.com) offers a computer media player with many different, interchangeable skins. Users can also create their own skins using a suitable graphics editor. Soft Shape (www.softshape.com) offer ActiveSkin, an ActiveX control that changes the visual appearance of forms and dialogs. In all cases, however, the skin is tied to a template and must line up geometrically with the underlying functional user interface elements. Consequently, the GUI designer has only limited flexibility in choosing the shapes, sizes and relative positions of the elements of the interface.

After the priority date of the present invention, the Quintessential CD "QCD 2.0 Player" was released. This player has a GUI that allows users to replace its entire skin without regard to shape, size or position of the original user interface supplied with the player. Features of QCD 2.0 skins are described in a document entitled "Designing User Interfaces ('Skins') for the QCD 2.0 Player," available at www.quinnware.com, which is incorporated herein by reference. Among the features of the skin implementations described in this document is the use of color coding to define "maps" that describe the location and shape of smaller controls that are overlaid on top of larger controls. Predefined colors tell QCD 2.0 what the associated pixels are supposed to mean in terms of user interface functions.

SUMMARY OF THE INVENTION

It is an object of some aspects of the present invention to provide improved tools and methods for use in creating a GUI.

It is a further object of some aspects of the present invention to provide tools that allow a user with only minimal programming know-how to build a GUI.

It is yet a further object of some aspects of the present invention to provide tools that afford enhanced flexibility in creating a GUI.

It is still a further object of some aspects of the present invention to separate the GUI from underlying application programs using object-oriented methods.

It is another object of some aspects of the present invention to enable the creation of GUIs that can be used in multiple, different applications.

It is yet another object of some aspects of the present invention to enable the creation of GUIs that can be used in different operating systems, as well as over networks, such as the Internet.

Preferred embodiments of the present invention provide a dynamic skin, which can be used by a designer of a GUI to lay out user interface elements on a computer screen freely, substantially without constraint as to their positions, shapes or sizes. The dynamic skin is based on a relation between predefined graphic elements and corresponding user interface functions of an application. The graphic elements and their relation to the corresponding user interface functions are specified by the GUI designer, typically in terms of the color or geometrical properties of the graphic elements. (These geometrical properties may also include providing graphic elements having the form of text characters.) The designer determines the positions, sizes and shapes of the elements of the GUI by means of the layout of the corresponding graphic elements on the screen. These elements are automatically mapped to the corresponding user interface functions. The mapping is maintained regardless of the operating system platform on which the application runs, and is unaffected by changes in the positions, sizes and shapes of the graphic elements.

The designer lays out the graphic elements on the screen, preferably using a standard "paint" program, without the need for any special editor or application-specific tools. Users can thus design and customize their user interface freely, while the functional mapping of the on-screen controls is maintained automatically. There is substantially no limit to the number of different graphic elements that can be used in this manner to invoke user interface functions. On the other hand, it is also possible to introduce graphic elements in the dynamic skin that invoke multiple functions, for example, by using an element that has a color corresponding to one function and a geometrical property corresponding to another. Furthermore, a given correspondence of graphic elements to user interface functions may be maintained across multiple applications having common user interface functions, without the need for software adapters or program changes. By the same token, consistency of appearance and functionality can be easily maintained in the GUI of a given application, regardless of whether the application runs on a local host or over a network, and even when the GUI is presented to the user through an Internet browser. There is generally no need for graphic-related development or adjustments in order to adapt the GUI for different client/server application configurations.

In some preferred embodiments of the present invention, the dynamic skin is used to change aspects of the GUI easily, even during run-time of the underlying application. Such changes can be invoked by the user, or they can be triggered by application content. For example, in a media player application, the appearance of the GUI can change depending on the song or video clip that the application is playing. Similarly, run-time changes to the GUI can be used to provide multiple views of the application controls during run-time—for example, zoom-in and zoom-out views or multiple views associated with different audio/video channels (such that for each channel that the user selects, all or part of the view is changed).

There is therefore provided, in accordance with a preferred embodiment of the present invention, a method for creating a graphic user interface (GUI) for a computer application, including:

defining a relation that associates certain graphic elements with corresponding user interface elements that are linked to functions of the application;

providing an image that includes one or more of the graphic elements at respective locations in the image; and generating a user interface screen responsive to the image, such that the user interface elements are mapped to positions on the screen determined by the respective locations of the corresponding graphic elements in the image.

Preferably, defining the relation includes associating graphic elements of a given color with a corresponding one of the user interface elements, wherein associating the graphic elements of the given color includes identifying a certain color with a background region of the user interface screen, and wherein generating the user interface screen includes displaying the background region as a transparent region.

Alternatively or additionally, defining the relation includes associating graphic elements of a given shape with a corresponding one of the user interface elements.

Preferably, providing the image includes changing a graphic quality of one of the graphic elements in the image, and generating the user interface screen includes changing the corresponding user interface element on the screen responsive to changing the graphic quality, substantially without effect on the function to which the element is linked. Most preferably, changing the graphic quality includes changing the location of the one of the graphic elements, and changing the corresponding user interface element includes changing the position of the user interface element. Alternatively or additionally, changing the graphic quality includes changing a size characteristic of the one of the graphic elements, and changing the corresponding user interface element includes changing a corresponding size characteristic of the user interface element on the screen.

Preferably, generating the user interface screen includes mapping the elements in a manner that is substantially independent of an operating platform on which the application runs. In a preferred embodiment, generating the user interface screen includes generating a browser screen on a computer accessing the application remotely via a network. Most preferably, generating the user interface screen includes generating substantially the same user interface on the browser and on a local client of the application. Further preferably, defining the relation includes defining a relation that is preserved across multiple, different applications.

Preferably, providing the image includes providing a bitmap image, such that the user interface elements are mapped responsive to the bitmap. Further preferably, generating the user interface screen includes building the screen based on the graphic elements, substantially without resort to a textual description of the user interface elements. Most preferably, generating the user interface screen includes building the screen based on the graphic elements, substantially without affecting the functions of the application. In a preferred embodiment, defining the relation includes associating the graphic elements with respective, predefined user interface objects and altering one of the predefined objects by inheritance thereof.

Preferably, generating the user interface screen includes providing a skin including graphic representations of the user interface elements at the approximate positions to which the graphic elements are mapped.

In a preferred embodiment, defining the relation includes identifying at least one of the graphic elements with a user interface push button.

In another preferred embodiment, defining the relation includes identifying at least one of the graphic elements with an area for display of text or graphics associated with the application.

In still another preferred embodiment, defining the relation includes identifying at least one of the graphic elements with a user control for selecting a value of a parameter from a range of values. Preferably, providing the image includes providing an input image in which the at least one of the graphic elements includes a range of colors corresponding to the range of values of the parameter. Alternatively or additionally, providing the image includes providing an input image in which the at least one of the graphic elements defines a range of positions of a slider corresponding to the range of values of the parameter. Preferably, the at least one of the graphic elements includes an elongate element that deviates substantially from a straight, linear shape.

In yet another preferred embodiment, generating the user interface screen includes altering an appearance of one or more of the user interface elements while the application is running. Preferably, altering the appearance includes providing multiple different views of the user interface screen, most preferably including zoom-in and zoom-out views. In an alternative embodiment in which the application is a multimedia player application having multiple channels, providing the multiple different views includes associating the different views with different channels of the multimedia player. Alternatively or additionally, the application presents content to the user, and altering the appearance includes altering the appearance of the one or more user interface elements responsive to a characteristic of the content.

There is also provided, in accordance with a preferred embodiment of the present invention, a computer software product for creating a graphic user interface (GUI) for a computer application, the product including a computer-readable medium in which program instructions are stored, which instructions, when read by a computer, cause the computer to receive a defined relation that associates certain graphic elements with corresponding user interface elements that are linked to functions of the application and to receive an image that includes one or more of the graphic elements at respective locations in the image, and to generate, responsive to the image, a user interface screen in which the user interface elements are mapped to positions on the screen determined by the respective locations of the corresponding graphic elements in the image.

There is additionally provided, in accordance with a preferred embodiment of the present invention, apparatus for creating a graphic user interface (GUI) for a computer application, including:

a GUI processor, which is adapted to receive a definition of a relation that associates certain graphic elements with corresponding user interface elements that are linked to functions of the application, and to receive an image that includes one or more of the graphic elements at respective locations in the image, and to generate a user interface screen responsive to the image, such that the user interface elements are mapped to positions on the screen determined by the respective locations of the corresponding graphic elements in the image; and a display, which is driven by the processor to display the user interface screen.

Preferably, the apparatus includes a pointing device, which is operable by a user of the apparatus to change a graphic quality of one of the graphic elements in the image, and the processor is adapted to change the corresponding user interface element on the screen responsive to changing the graphic quality, substantially without effect on the function to which the element is linked.

The present invention will be more fully understood from the following detailed description of the preferred embodiments thereof, taken together with the drawings in which:

DETAILED DESCRIPTION OF PREFERRED EMBODIMENTS

Figure 1:
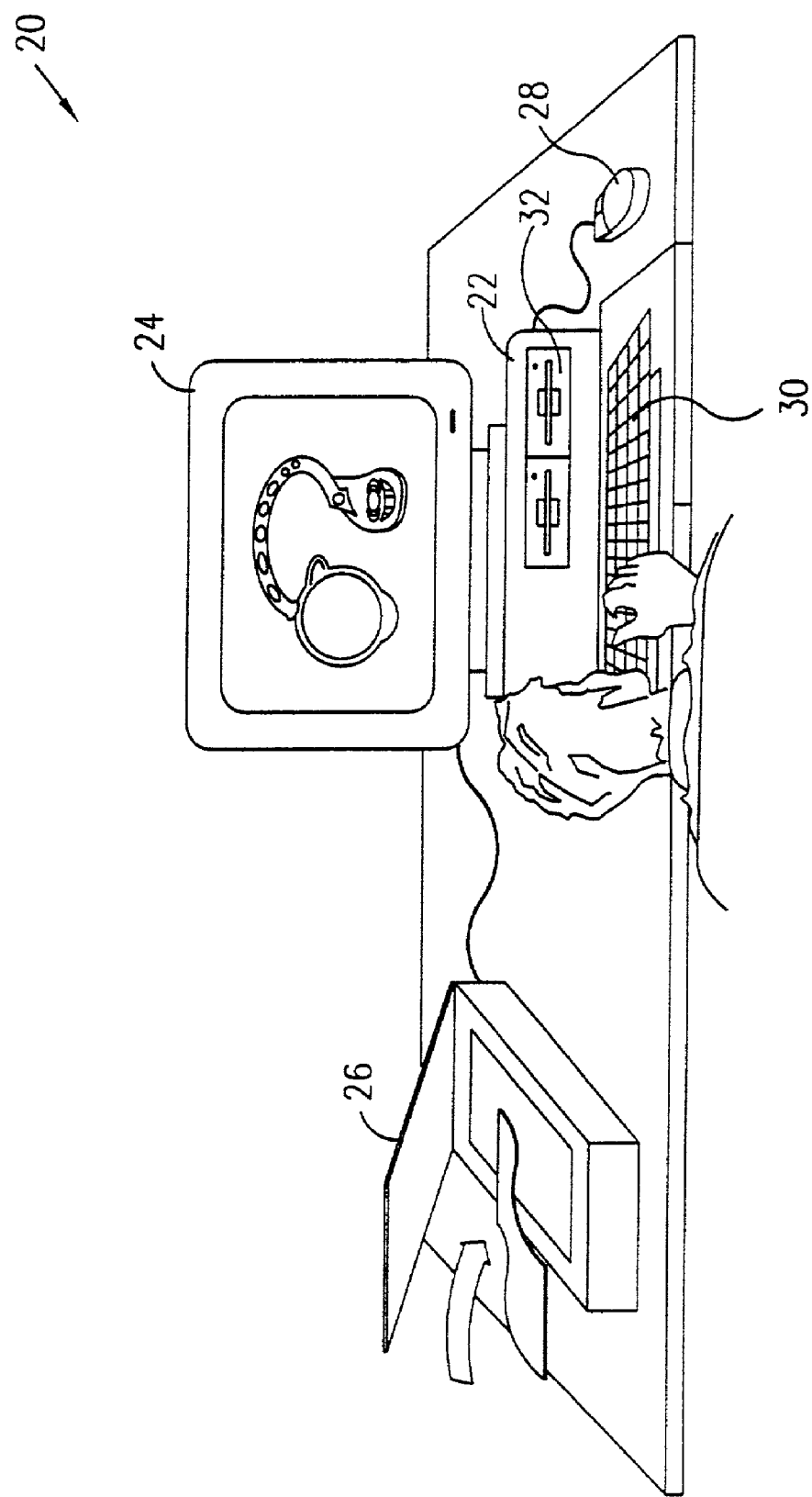
FIG. 1 is a schematic, pictorial illustration of a system for design of a GUI, in accordance with a preferred embodiment of the present invention.

FIG. 1 is a schematic, pictorial illustration of a system 20 for use in designing a flexible GUI, in accordance with a preferred embodiment of the present invention. System 20 comprises a processor 22, typically an industry-standard personal computer, with peripheral devices including a display 24, a pointing device 28, a keyboard 30 and disk memory 32. Optionally, system 20 also includes an imaging device 26, such as a scanner. Processor 22 preferably runs a standard operating system, such as one of the Microsoft Windows operating systems, UNIX, or substantially any other operating system known in the art that supports graphic windows. Software for use in designing and running the flexible GUI, as described in detail hereinbelow, may be supplied to processor 22 over a network or on tangible media, such as CD-ROM.

Figure 2:
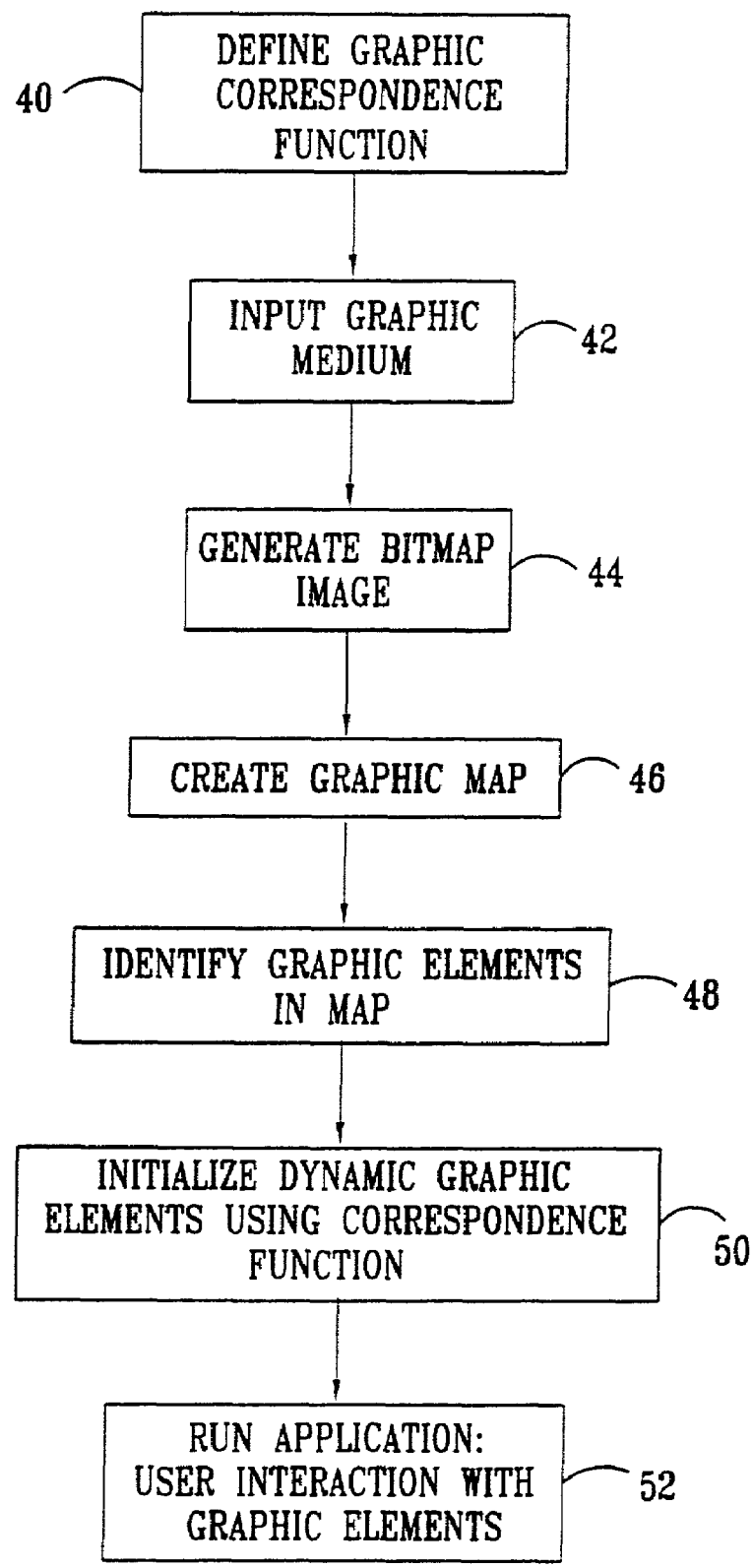
FIG. 2 is a flow chart that schematically illustrates a method for designing a GUI, in accordance with a preferred embodiment of the present invention.

FIG. 2 is a flow chart that schematically illustrates a method for designing a flexible GUI, in accordance with a preferred embodiment of the present invention. At a correspondence definition step 40, a correspondence is defined between specified user interface functions and graphic elements. The user interface functions preferably comprise methods, which are most preferably defined by a programmer of the application by inheritance from a dynamic skin class. Each graphic element comprises a set of points, or pixels, in a graphic image having certain predefined properties. The set typically comprises a large collection of pixels covering a region of the computer screen, but it may alternatively comprise any number of pixels or even only a single pixel.

For example, a graphic element may be defined as comprising all of the pixels on the screen of a given color or range of colors. On the other hand, a graphic element may also be defined as a group of pixels that form a particular shape, such as a star or octagon, or as a group of pixels having both a particular shape and a particular color. The defined shape of the graphic element may also comprise letters or a word, such as "PLAY," which is recognized by processor 22 using methods of image recognition known in the art. The graphic element may further be defined in terms of an area of a given color surrounding certain letters or a word.

The result of step 40 is a correspondence function relating user-defined graphic elements to the specified user interface functions of an application. The function preferably has the form of an initialization file, external to the application, which can be changed by the user without affecting the methods of the user interface. Such a correspondence function, appropriate for a media player application, for example, is illustrated in Table I below:

TABLE I

| Graphic element | Application function |
|---|---|
| Yellow octagon | Play |
| Red area | Stop |
| Pentagram | Forward |
| Triangle | Back |

More complex shapes may also be used, such as particular images that are recognizable by the computer. Furthermore, although the elements described above and appearing in the table are all two-dimensional, three-dimensional shapes may also be used as graphic elements, so long as they are defined in a manner that enables the computer to recognize them.

At a medium input step 42, one or more graphic media are input to processor 22. One of these media is to serve as a dynamic skin for the GUI of the application, as described in detail hereinbelow. Additional media may be input to serve as an overlay skin for the GUI, which users of the application will see on screen. The graphic media may be scanned using imaging device 26 or they may be input to the processor as a file. Alternatively, the graphic media may be created by the GUI designer using any suitable paint or imaging program known in the art. If a graphic medium is not already in bitmap form, it is converted to a bitmap, preferably a 24-bit RGB bitmap, at a bitmap generation step 44. The bitmap of the dynamic skin is then used by the computer to create a graphic map, at a map creation step 46. The graphic elements, such as those defined in Table I above, and the relations between them are identified in the map at an identification step 48. They are used to position and initialize the corresponding dynamic user interface elements, based on the defined correspondence function, at an initialization step 50. The GUI is then available for user interaction when the application is run, at a run step 52. Details of these steps will now be described with reference to a number of specific examples.

Figure 3:
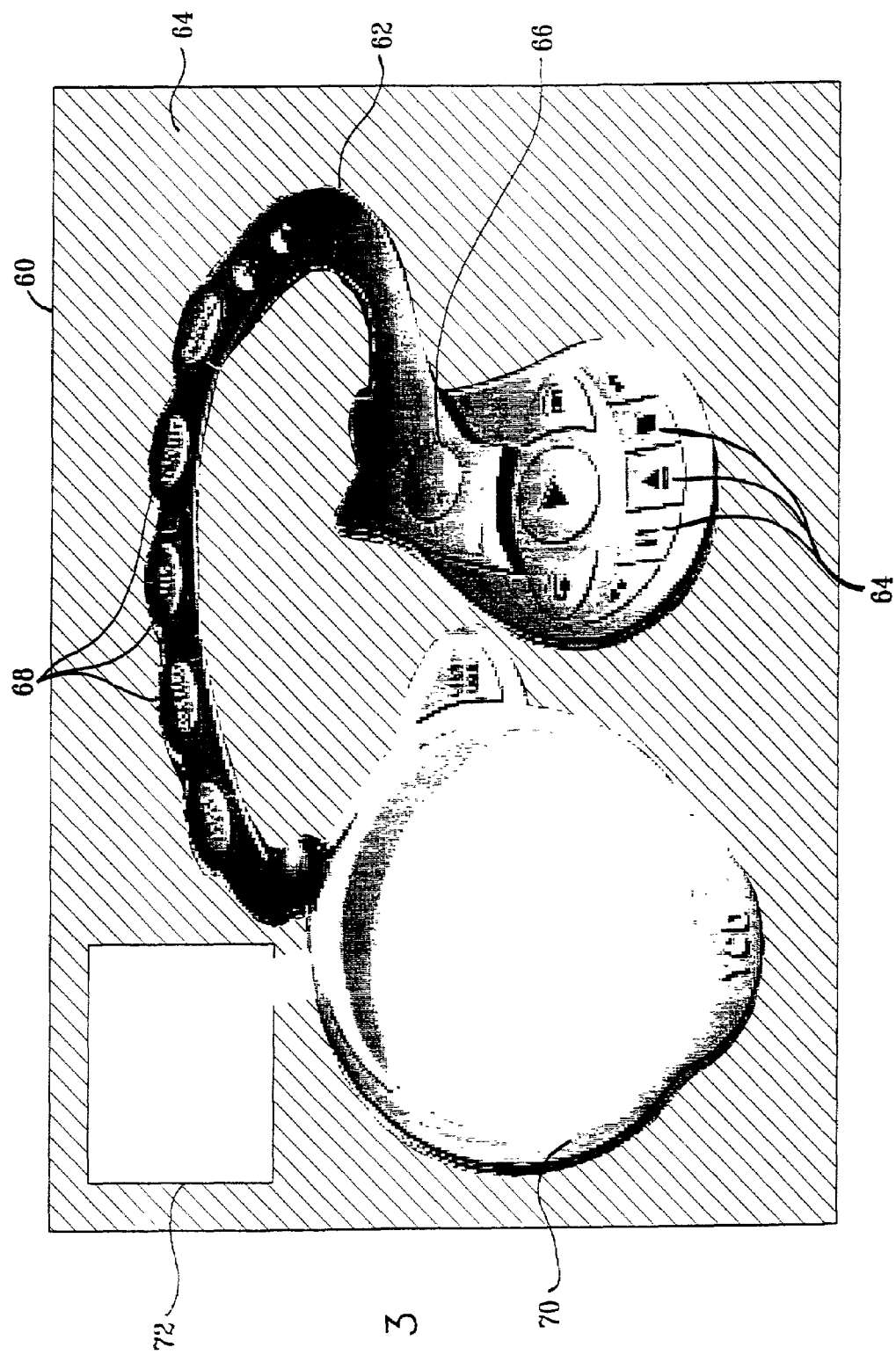
FIG. 3 is a schematic image of a computer screen illustrating a design for a GUI, in accordance with a preferred embodiment of the present invention.

FIG. 3 is a schematic image of computer display 24, showing the design of an application window 60, which serves as a GUI skin for an exemplary media player application, in accordance with a preferred embodiment of the present invention. The window comprises a rectangular area in which an image of a user interface device 62 appears against a background 64. Device 62 includes controls such as push-buttons 64 and 68, a multi-position knob 66, a text area 70 and a graphic area 72. Each of these controls is tied to the functions of the media player by a dynamic skin, as described hereinbelow.

Device 62, with its controls is preferably defined as that part of window 60 that does not belong to background 64 and does not belong to any other graphic element that may be associated with the application. Background 64 is preferably all of one color, represented in the figure by hatching. The selected background color is preferably specified at step 40. Device 62 can then be defined as the part of window 60 that is not of that color. Background 64 is itself defined as corresponding to a background element of the GUI. It is associated in the application user interface with a background object, responsible for drawing the background of the window in which the application is running. Preferably, when the application window is open, the background is transparent.

Figure 4:
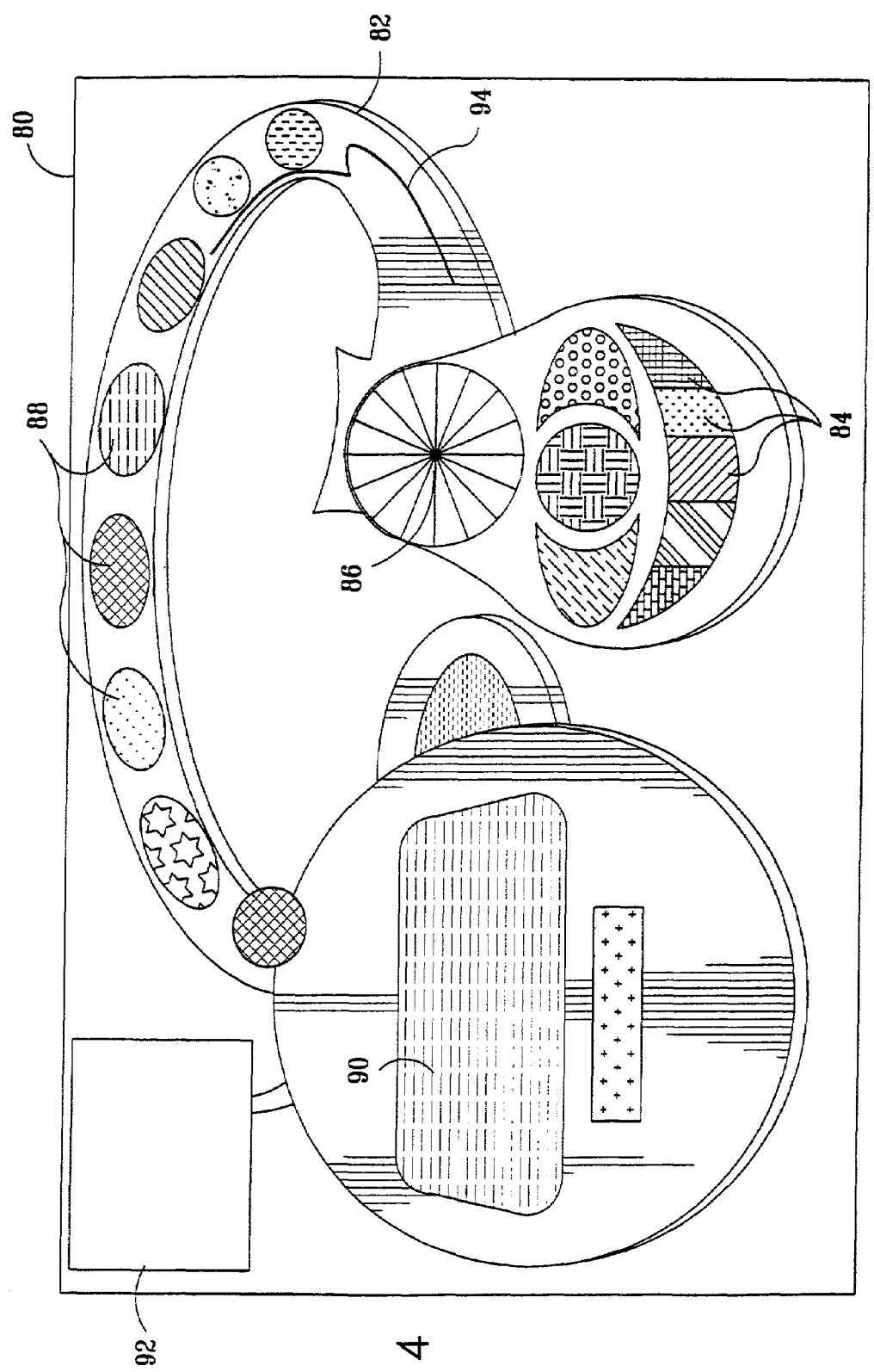
FIG. 4 is a schematic image of a computer screen illustrating a dynamic skin associated with the GUI of FIG. 3, in accordance with a preferred embodiment of the present invention.

FIG. 4 is a schematic representation of a dynamic skin image 80, created by a user to control the media player of FIG. 3, in accordance with a preferred embodiment of the present invention. Preferably, image 80 is created on processor 22 using a standard "paint" program, as is known in the art. Alternatively, the image may be scanned into system 20, for example, using image capture device 26. Thus, it is even possible for the user to create image 80 by coloring by hand on paper. Image 80 contains a device region 82, corresponding to device 62, and has areas 84, 86, 88, 90, 92 of different colors, which correspond to the user controls and text and graphic areas of device 62. These different colors are represented in the figure by different styles of hatching. Preferably, in generating the graphic map of image 80 at step 46, pixels of the same color, belonging to each of the different areas, are tied together by a graph, in which each of the pixels in the area points to a subsequent one, so that the area is fully defined.

As defined at step 40, each of the colors of the different areas corresponds to a particular user interface element. Thus, areas 84 and 88 correspond to the different functions of push buttons 64 and 68, respectively. Area 86 corresponds to multi-position knob 66. Areas 90 and 92 correspond to text and graphic areas 70 and 72, respectively. In addition, a linear area 94 is used to define a slider in the GUI of the media player. Some of these elements are described in greater detail hereinbelow. Preferably, the correspondence function between the graphic elements and user interface functions also specifies a hierarchy, so that when two or more user controls overlap, they are "stacked" in the proper order in the GUI that appears on the computer display.

With respect to pushbuttons 64 and 68, the graphic media that are input to processor 22 at step 42 preferably comprise two different skin images for each button: one showing the button in its rest position (unpressed), and another in its depressed position. The depressed image typically shows the button as though it has been pressed down into device 62. Optionally, the color of the button also changes, typically to a brighter color, as though the button is lit up. The user interface function associated with each of areas 84 and 88 in the dynamic skin map is such that when a user of the application clicks on any of the areas with pointing device 28, the depressed image of the corresponding push button is substituted for its rest image. At the same time, the appropriate application function, such as "play" or "stop," is invoked. As shown in FIGS. 3 and 4, it is not necessary that the controls in the skin image and the corresponding areas of the dynamic skin be of exactly the same size and shape.

As noted above, areas 90 and 92 in FIG. 4 define corresponding text and graphic areas in the GUI. In a similar manner, a freehand painting region (not shown in the figures) may be defined. For this purpose, the graphic media that are input at step 42 preferably also include files defining the foreground and background colors to be used for freehand drawing. Text fonts are preferably defined for these areas by a programmer of the GUI, either in bitmap form or by specifying appropriate system fonts to use. When the application is running, at step 52, and the user manipulates the cursor in the corresponding painting region, the cursor movements will be recorded in a bitmap record of the region and will appear as areas of foreground or background color in the region. Preferably, user controls are provided enabling the user to select foreground or background color and to vary parameters such as color intensity, brush width, etc., as is known in the art.

Figure 5A:
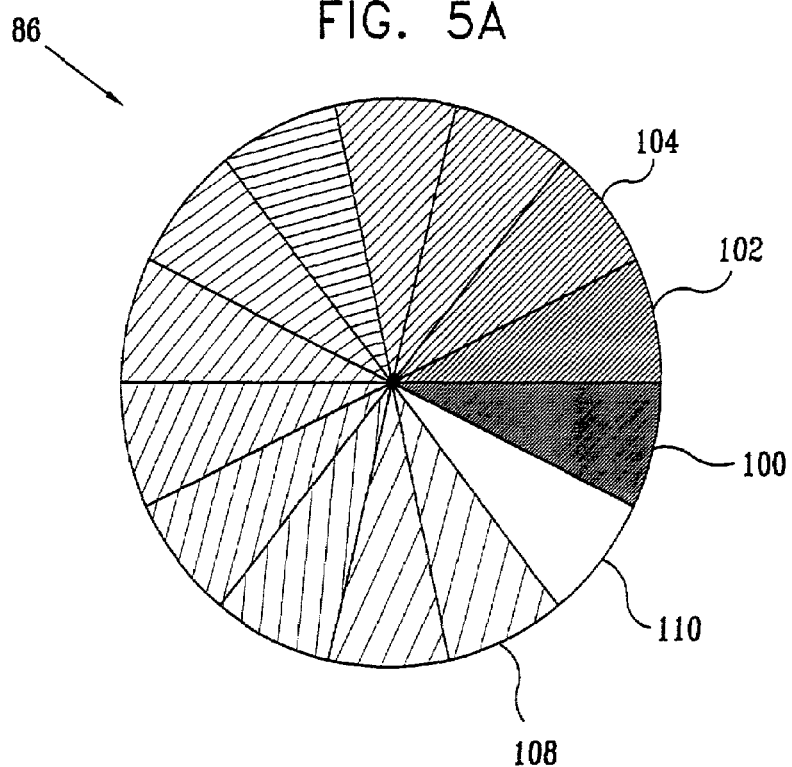
FIG. 5A is a schematic illustration of a detail of a graphic element used in the dynamic skin of FIG. 4, in accordance with a preferred embodiment of the present invention.
Figure 5B:
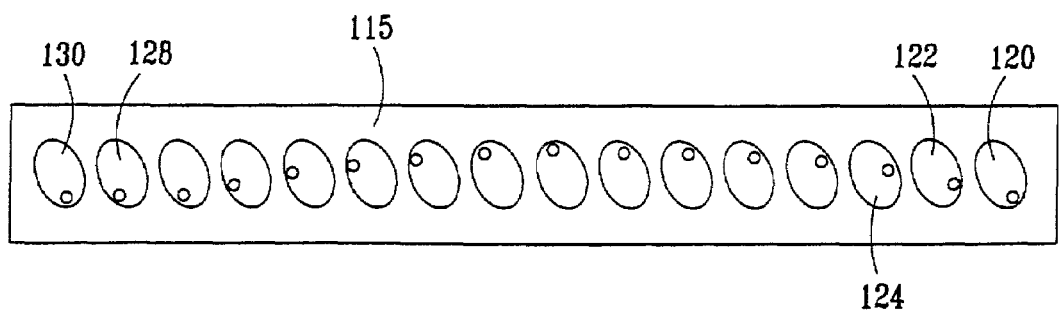
FIG. 5B is a schematic graphic image showing multiple states of an on-screen control used in the GUI of FIG. 3, in accordance with a preferred embodiment of the present invention.

FIGS. 5A and 5B schematically illustrate the graphic media used in creating and operating multi-position knob 66, in accordance with a preferred embodiment of the present invention. FIG. 5A shows a detail of area 86 in the dynamic skin medium of FIG. 4, while FIG. 5B shows a strip 115 containing images 120, 122, 124, . . . , 128, 130 of knob 68 in different positions. Area 86 is divided into sectors 100, 102, 104, . . . , 108, 110 of different colors (represented by the different hatching styles). Each of these sectors corresponds to one of the images in strip 115. As will be apparent by comparison of FIGS. 3 and 4, area 86 does not exactly correspond in size to knob 66, and the user or designer of the GUI preferably designates a position within area 86 in which the appropriate one of images 120, 122, 124, . . . , 128, 130 is to be positioned. Most preferably, the position of the image is roughly centered in area 86.

When the application is running, there is an application object associated with area 86 that interprets user mouse clicks within sectors 100, 102, 104, . . . , 108, 110 according to the color of the respective sector. Preferably, the colors of the sectors have a common hue, and vary in intensity and/or saturation from a minimum (dark color) in sector 100 to a maximum in sector 110. The color gradations correspond to levels of a variable parameter in the application, such as the volume of sound played by the media player. The limits of the parameter and the granularity of its variation are controlled by a programmer of the application, typically by inheriting the appropriate application object with whatever modifications are necessary. The application object associated with area 86 responds to each mouse click in one of the sectors by calling for the corresponding image from strip 115 to be displayed in the GUI and by passing the corresponding value of the variable parameter to the application.

Figure 6:
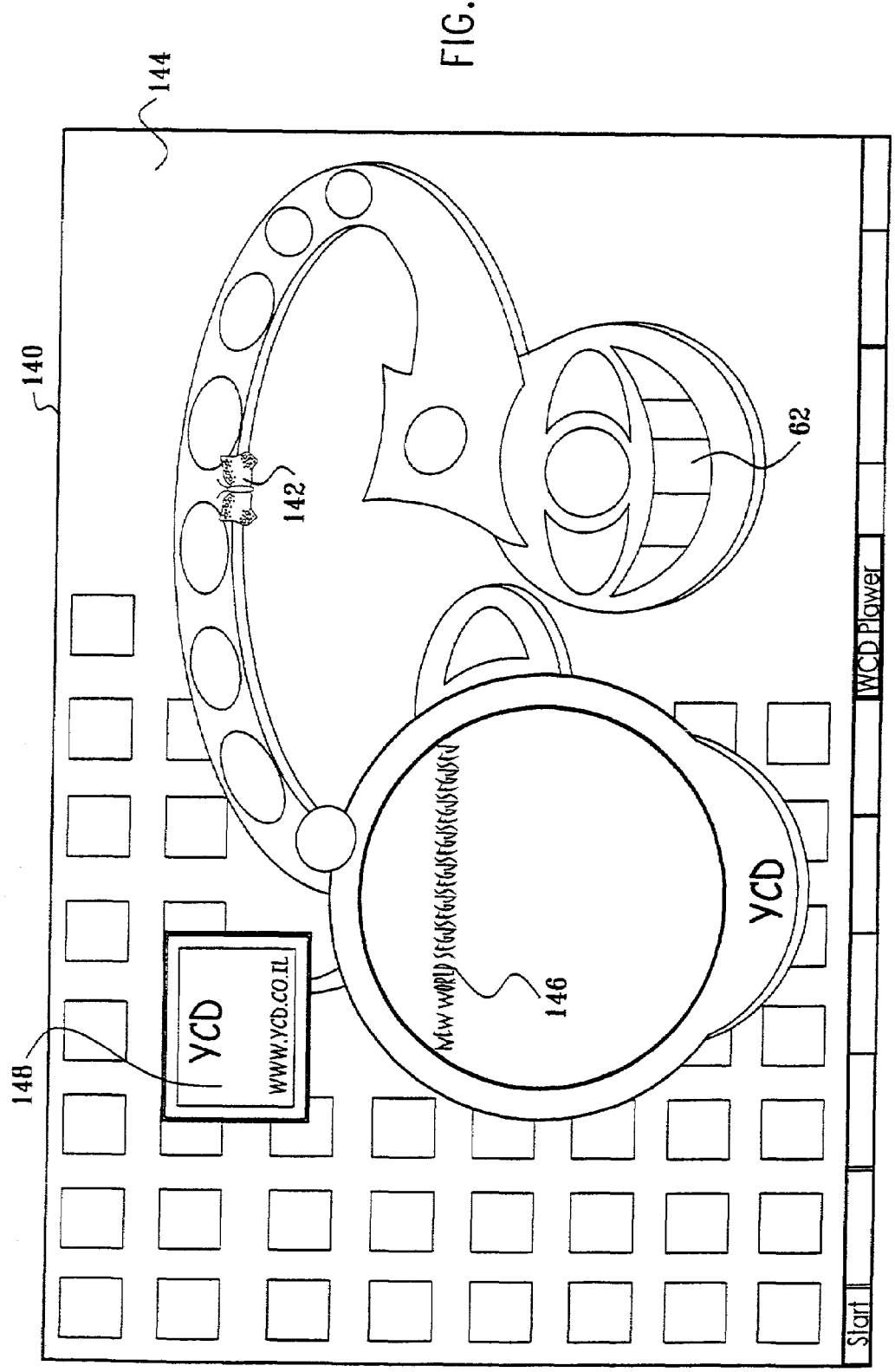
FIG. 6 is a schematic image of a computer screen illustrating the GUI of FIG. 3 in operation, in accordance with a preferred embodiment of the present invention.

FIG. 6 is a schematic representation of a computer screen 140 showing the GUI of the media player application described above, in accordance with a preferred embodiment of the present invention. Device 62 appears in the foreground of the screen, while a background region 144 of the media player window is transparent. The application has entered a text message 146 in text area 70 and displays a graphic logo 148 in graphic area 72. A slider element 142 has also been added to the device. By clicking on element 142 and dragging it along the length of device 62, the user is able to adjust a variable parameter of the application that is associated with the slider.

The slider is defined by linear area 94 in dynamic skin image 80, together with an image of the graphic element (in this case a butterfly) used as the slider element. Although area 94 could be drawn as a straight line, like sliders known in the art, in the present embodiment it is drawn as a curve with an angled portion midway along its length. The use of the dynamic skin allows the path of the slider to have substantially any reasonable shape, and allows substantially any graphic to be used as the slider element. To operate the slider, processor 22 preferably maps a two-dimensional graph of area 94 onto a virtual straight line. Most preferably, a "shortest path" algorithm, as is known in graph theory, is used to locate the points on the graph, and ray tracing is used to find the optimal mapping for each point. The linear distance traversed by element 142 to reach any point along area 94 is thus translated into a single coordinate value that indicates the proportional position of the point between the ends of the graph. Alternatively, other methods may be used for mapping the slider element to the corresponding values of the parameter.

The dynamic skin can also be used to define a two-dimensional "super slider" (not shown in the figures). In this case, a slider area is defined by means of a corresponding two-dimensional area of the dynamic skin image. Each position in this area has an X,Y value relative to an origin fixed in the area. The two-dimensional slider value is determined by the relative X and Y coordinates of the cursor position in the super slider area.

Although a certain type of GUI has been chosen to be shown in the figures, with certain types of user interface elements selected for description hereinabove, it will be understood that the principles of the present invention may likewise be applied to the design of user interfaces for substantially any type of software application or other program. The GUI will generally be portable to substantially any operating environment, and can also work as a platform-independent GUI, run by a Java Virtual Machine, for example. User interface elements of other types, which may be defined and actuated using dynamic skin, will be apparent to those skilled in the art.

Furthermore, GUIs based on the present invention may also be used in client/server and network browsing environments. In such network environments, a Java applet or browser plug-in preferably reads the graphic elements on the screen of the client computer and conveys them to the server on which the application is running. Because of the portability of the GUI, it can be used substantially without change both in the browser and in other (non-Internet) client/server environments. The consistency of appearance and functionality of the GUI is thus maintained regardless of whether the application runs on a local host or through an Internet browser or other network interface, without the need for graphic-related development or adjustments.

In the preferred embodiments described above, the appearance of the GUI shown on screen 140 is determined before the underlying application (the media player) begins to run. In other preferred embodiments of the present invention, however, the dynamic skin is used to change aspects of the GUI during run-time of the underlying application. This feature is made possible in these preferred embodiments by the fact that in the object-oriented approach of the present invention, all of the graphical elements are dynamic software objects, i.e., they are methods in a class. Therefore, these objects can reload new dynamic skin bitmaps and thus can change their behavior and appearance during run-time. Such changes can be invoked by the user, or they can be triggered by application content. For example, the appearance of the GUI can change depending on the song or video clip that the media player is playing. Similarly, run-time changes to the GUI can be used to provide multiple views of the application controls during run-time—for example, zoom-in and zoom-out views, or multiple views associated with different audio/video channels of a multi-media player application (such that for each channel that the user selects, all or part of the view is changed).

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for creating a graphic user interface (GUI) for a computer application, comprising:
    defining user interface objects and user interface elements corresponding to the user interface objects in a GUI layer that is separate from the computer application;
    arbitrarily defining a mapping between the user interface objects and respective locations in a user interface screen, wherein the mapping defines the locations independently of the computer application and comprises defining a relation that associates the user interface objects with corresponding features in an image provided by a designer of the GUI, receiving the image from the designer, wherein the image comprises one or more of the features in respective positions, and determining the respective locations of the user interface objects based on the respective positions of the corresponding features in the image;
    generating the user interface screen comprising the user interface elements in the respective locations determined by the mapping; and
    linking the user interface objects in the GUI layer to methods in the computer application, so that interaction of a user with the user interface elements in the user interface screen invokes the methods linked to the objects.

2. A method according to claim 1, wherein defining the relation comprises associating the features of a given color with a corresponding one of the user interface objects.

3. A method according to claim 2, wherein associating the features of the given color comprises identifying a certain color with a background region of the user interface screen, and wherein generating the user interface screen comprises displaying the background region as a transparent region.

4. A method according to claim 2, wherein defining the relation comprises associating the features of a given shape with a corresponding one of the user interface objects.

5. A method according to claim 2, wherein receiving the image comprises changing a graphic quality of one of the features in the image, and
    wherein generating the user interface screen comprises changing the corresponding user interface element on the user interface screen responsive to changing the graphic quality, without effect on the method to which the corresponding user interface object is linked.

6. A method according to claim 5, wherein changing the graphic quality comprises changing the position of the one of the features in the image, and
    wherein changing the corresponding user interface element comprises changing the location of the user interface element in the user interface screen.

7. A method according to claim 5, wherein changing the graphic quality comprises changing a size characteristic of the one of the features in the image, and wherein changing the corresponding user interface element comprises changing a corresponding size characteristic of the user interface element in the user interface screen.

8. A method according to claim 2, wherein receiving the image comprises receiving a bitmap image, such that the respective locations of the user interface objects are determined responsive to the bitmap image.

9. A method according to claim 2, wherein generating the user interface screen comprises building the user interface screen based on the features of the image received from the designer, without resort to a textual description of the user interface elements.

10. A method according to claim 2, wherein defining the relation comprises identifying at least one of the features in the image with a user interface push button.

11. A method according to claim 2, wherein defining the relation comprises identifying at least one of the features in the image with an area for display of text or graphics associated with the application.

12. A method according to claim 2, wherein defining the relation comprises identifying at least one of the features in the image with a user control for selecting a value of a parameter from a range of values.

13. A method according to claim 12, wherein the at least one of the features in the image comprises a range of colors corresponding to the range of values of the parameter.

14. A method according to claim 12, wherein the at least one of the features in the image defines a range of positions of a slider corresponding to the range of values of the parameter.

15. A method according to claim 14, wherein the at least one of the features in the image comprises an elongate feature that deviates from a straight, linear shape.

16. A method according to claim 1, wherein defining the user interface objects comprises altering one of the user interface objects by inheritance thereof.

17. A method according to claim 1, wherein generating the user interface screen comprises providing a skin including graphic representations of the user interface elements at the locations to which the corresponding user interface objects are mapped.

18. A method according to claim 1, wherein generating the user interface screen comprises altering an appearance of one or more of the user interface elements while the application is running.

19. A method according to claim 18, wherein altering the appearance comprises providing multiple different views of the user interface screen.

20. A method according to claim 19, wherein providing the multiple different views comprises providing zoom-in and zoom-out views.

21. A method according to claim 19, wherein the application comprises a multimedia player application having multiple channels, and wherein providing the multiple different views comprises associating the different views with different channels of the multimedia player.

22. A method according to claim 18, wherein the application presents content to the user, and wherein altering the appearance comprises altering the appearance of the one or more user interface elements responsive to a characteristic of the content.

23. A method according to claim 1, wherein arbitrarily defining the mapping comprises mapping the user interface objects in a manner that is independent of an operating platform on which the application runs.

24. A method according to claim 1, wherein generating the user interface screen comprises generating a browser screen on a computer accessing the application remotely via a network.

25. A method according to claim 24, wherein generating the user interface screen comprises generating the same user interface screen on the browser and on a local client of the application.

26. A method according to claim 1, wherein arbitrarily defining the mapping comprises defining a relation that is preserved across multiple, different applications.

27. A computer software product for creating a graphic user interface (GUI) for a computer application, the product comprising a computer-readable medium in which program instructions are stored, which instructions, when read by a computer, cause the computer to receive a definition of user interface objects and user interface elements corresponding to the user interface objects in a GUI layer that is separate from the computer application, and to receive an arbitrary definition of a mapping between the user interface objects and respective locations in a user interface screen, wherein the mapping defines the locations independently of the computer application, the mapping being defined in terms of a relation that associates the user interface objects with corresponding features in an image provided by a designer of the GUI, and wherein the instructions cause the computer to receive the image from the designer, wherein the image comprises one or more of the features in respective positions, and to determine the respective locations of the user interface objects based on the respective positions of the corresponding features in the image, the instructions further causing the computer to generate the user interface screen comprising the user interface elements in the respective locations determined by the mapping, and to link the user interface objects in the GUI layer to methods in the computer application, so that interaction of a user with the user interface elements in the user interface screen invokes the methods linked to the objects.

28. A product according to claim 27, wherein the instructions cause the computer to associate the features of a given color with a corresponding one of the user interface objects.

29. A product according to claim 27, wherein the instructions cause the computer to associate the features of a given shape with a corresponding one of the user interface objects.

30. A product according to claim 27, wherein the instructions cause the computer, responsive to a change made by a user in a graphic quality of one of the features in the image, to change the corresponding user interface element on the screen responsive to changing the graphic quality, without effect on the method to which the corresponding user interface object is linked.

31. A product according to claim 27, wherein the instructions cause the computer to generate the user interface screen without dependence on an operating platform on which the application runs.

32. A product according to claim 27, wherein the mapping between the user interface objects and the respective locations in the user interface screen is preserved across multiple, different applications.

33. A product according to claim 27, wherein the instructions enable the computer to alter an appearance of one or more of the user interface elements while the application is running.

34. Apparatus for creating a graphic user interface (GUI) for a computer application, comprising:

a GUI processor, which is adapted to receive a definition of user interface objects and user interface elements corresponding to the user interface objects in a GUI layer that is separate from the computer application, and to receive an arbitrary definition of a mapping between the user interface objects and respective locations in a user interface screen, wherein the mapping defines the locations independently of the computer application, the mapping being defined in terms of a relation that associates the user interface objects with corresponding features in an image provided by a designer of the GUI, and wherein the processor is adapted to receive the image from the designer, wherein the image comprises one or more of the features in respective positions, and to determine the respective locations of the user interface objects based on the respective positions of the corresponding features in the image wherein the GUI processor is further adapted to generate the user interface screen comprising the user interface elements in the respective locations determined by the mapping, and to link the user interface objects in the GUI layer to methods in the computer application, so that interaction of a user with the user interface elements in the user interface screen invokes the methods linked to the objects; and a display, which is driven by the processor to display the user interface screen.

35. Apparatus according to claim 34, wherein the processor is adapted to associate the features of a given color with a corresponding one of the user interface objects.

36. Apparatus according to claim 34, wherein the processor is adapted to associate the features of a given shape with a corresponding one of the user interface objects.

37. Apparatus according to claim 34, and comprising a pointing device, which is operable by the designer to change a graphic quality of one of the features in the image, wherein the processor is adapted to change the corresponding user interface element on the screen responsive to changing the graphic quality, without effect on the method to which the corresponding user interface object is linked.

38. Apparatus according to claim 34, wherein the mapping between the user interface objects and the respective locations in the user interface screen is preserved across multiple, different applications, without dependence on an operating system run by the processor.

39. Apparatus according to claim 34, wherein the processor is adapted to alter an appearance of one or more of the user interface elements while the application is running.

* * * * *